United States Patent [19]
Broeder et al.

[11] Patent Number: 6,004,071
[45] Date of Patent: Dec. 21, 1999

[54] METHODS OF INSTALLING ELONGATE UNDERWATER STRUCTURES

[75] Inventors: Rene Broeder, Culemborg, Netherlands; Philip Scott, Chichester, United Kingdom

[73] Assignee: Heerema Marine Contractors, Leiden, Netherlands

[21] Appl. No.: 09/132,812

[22] Filed: Aug. 12, 1998

[30] Foreign Application Priority Data

Mar. 27, 1998 [GB] United Kingdom .................. 9806678

[51] Int. Cl.⁶ ..................................... F16L 1/12
[52] U.S. Cl. ..................... 405/166; 405/168.1; 405/169
[58] Field of Search .............................. 405/168.1–172, 405/195.1, 158

[56] References Cited

U.S. PATENT DOCUMENTS

| | | | |
|---|---|---|---|
| 3,685,306 | 8/1972 | Mott ....................................... | 405/168.3 |
| 3,822,559 | 7/1974 | Matthews et al. ...................... | 405/166 |
| 4,068,489 | 1/1978 | Prioroggis ............................. | 405/168.1 |
| 4,486,123 | 12/1984 | Koch et al. .......................... | 405/166 X |
| 4,710,059 | 12/1987 | Hazlegrove et al. ............. | 405/168.1 X |
| 5,348,423 | 9/1994 | Maloberti . | |
| 5,421,675 | 6/1995 | Brown et al. ....................... | 405/166 X |
| 5,464,307 | 11/1995 | Wilkins .................................. | 405/166 |

FOREIGN PATENT DOCUMENTS

| | | | |
|---|---|---|---|
| 844332 | 7/1952 | Germany ................................ | 405/166 |
| 2217424 | 10/1989 | United Kingdom ................... | 405/166 |
| 2287518 | 9/1995 | United Kingdom ................... | 405/166 |

*Primary Examiner*—Dennis L. Taylor
*Attorney, Agent, or Firm*—Fulwider Patton Lee & Utecht, LLP

[57] ABSTRACT

The disclosure relates to a method of laying a seabed pipeline from a surface vessel. Pipe strings are assembled from their upper ends from the vessel for attachment in a pipeline extending from the vessel to the seabed. An upper end of a pipe string is attached to a trailing end of a pipeline, the pipeline is guided through a generally semi-circular curved path having an upwardly directed entry and a downwardly directed exit from where the pipeline extends to the seabed. The vessel is moved forwardly while guiding the pipeline around said curved path so that the pipe string passes around the path and is then released in a downwards direction towards the seabed until the trailing end of the pipe string is above sea level. The vessel is then stopped, an upper end of a further pipe string is aligned at the entry to the curved path, the upper end of the further pipe string is connected to the trailing end of the pipeline and then forward movement of the vessel and release of the pipeline from the vessel are resumed to lay the pipeline on the seabed.

18 Claims, 8 Drawing Sheets

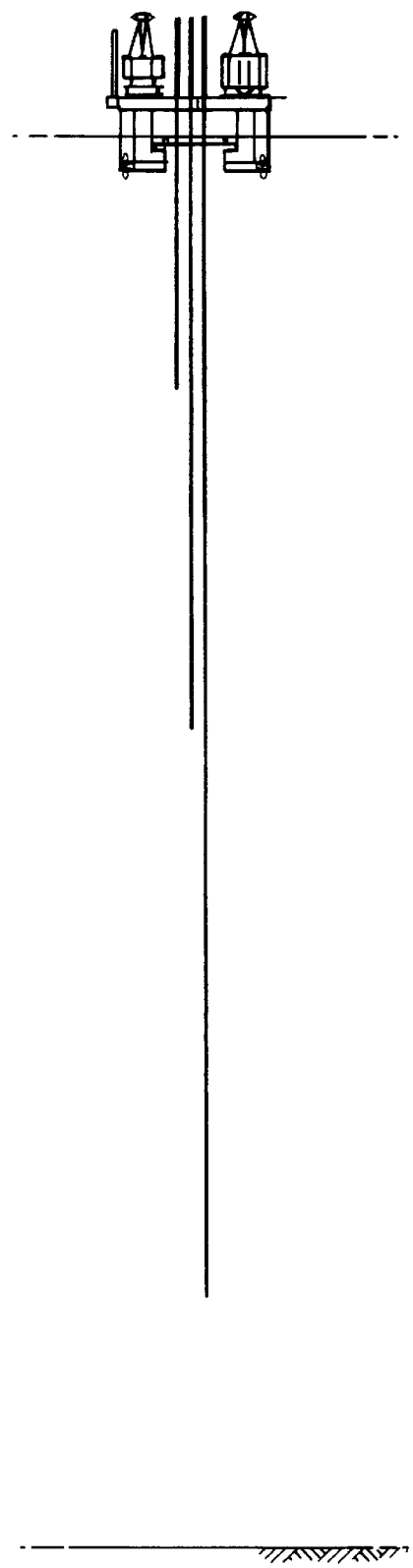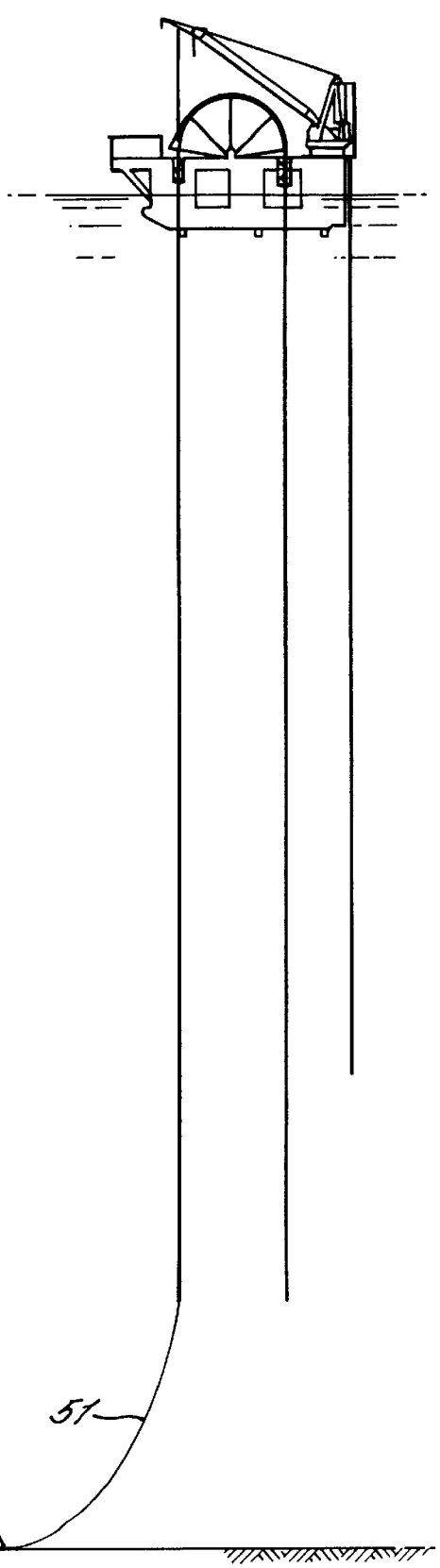

LAY DIRECTION

LAY DIRECTION

LAY DIRECTION

LAY DIRECTION

METHODS OF INSTALLING ELONGATE UNDERWATER STRUCTURES

BACKGROUND OF THE INVENTION

1. Field of the Invention

This invention relates to methods of installing elongate underwater structures. In particular, the invention relates to methods of making elongate underwater structures and also to methods of laying seabed pipelines from a surface vessel and to vessels for laying underwater pipelines.

2. Background Prior Art

In the production and laying of rigid conduits, e.g. steel pipe for the transportation of oil or gas, from a vessel on to the seabed there are three basic known methods as follows:

1. S-lay

In this method the conduit leaves the lay vessel in a substantially horizontal orientation, bends downwards over a supporting structure, the so-called stinger, and when approaching the sea bottom bends upwards to be laid on the sea bottom. The sideview of the pipeline being laid has an extended S form, the actual shape dependent on pipe weight, water depth and the tension applied to the conduit. A typical example of S-lay is disclosed in U.S. Pat. No. 3,715,890.

The main advantage of the S-lay method is its relatively high production speed particularly in the case where the conduit is composed of steel pipes to be welded together and the vessel is long enough to deploy an economic number of welding stations. The main disadvantage is that for very deep water either the tension to be applied to the conduit has to be very high or a stinger of such a size is required that it cannot easily be supported on a typical lay vessel.

2. J-Lay

The conduit leaves the lay vessel in a downwardly inclined or even near vertical orientation in order to allow the laying of pipelines in deep water without stressing the pipeline material excessively. This method is explained in U.S. Pat. Nos. 3,266,256 and 3,389,563 to which reference should be made. It should be noted that the method can also be applied in shallow water as illustrated in the article "The one-ship work fleet", published in Ocean Industry of March 1970, pages 52–54.

The main disadvantage of this method is that only a relatively slow production speed is possible because usually only one welding station can be worked on at a time which reduces the production speed significantly compared with the S-lay method where welding is done in a number of welding stations.

3. Reel-lay

Reel-lay can be considered as a variation of J-lay because the conduit leaves the lay vessel in an inclined or even near vertical orientation. The method uses a storage reel on which conduit is stored to be unreeled at site. This method gives a very high lay speed and is obviously advantageous when flexible conduits or cables have to be laid. Examples of this method are disclosed in U.S. Pat. No. 3,389,563 (FIG. 4) and in U.S. Pat. No. 4,340,322 which discloses a self-propelled reel pipe laying ship. A disadvantage of this method relates to the limited capacity of the reels, necessitating regular reloading or change out of reels when a long pipeline is being laid.

Ideas to overcome some disadvantages related to the above mentioned lay methods and combining the advantages of the same are disclosed in International Patent Publication No. WO 95/25237. To limit the bending radius of the steel pipe and hence to limit the diameter of the reel or other curved guiding means, a certain plastic deformation of the pipeline is allowed. This is normal procedure when using the reel-lay method but does require expensive straightening means to straighten the pipeline after the pipeline has left the reel or any other curved part which includes plastic deformation in the pipeline. Other disadvantages of the proposed methods in WO 95/25237 are the necessity to bend and straighten the pipeline more than once (as shown in FIGS. 4 and 5) or that a certain offset angle is required to allow the vertical part of the pipeline to pass the horizontal part of the pipeline.

SUMMARY OF THE INVENTION

Thus the invention further provides a method of laying a seabed pipeline from a surface vessel comprising the steps of assembling pipe strings suspended at their upper ends vertically from the vessel for attachment in a pipeline extending from the vessel to the seabed, attaching an upper end of a pipe string to a trailing end of a pipeline, guiding the pipeline through a generally semi-circular curved path having an upwardly directed entry and a downwardly directed exit from where the pipeline extends to the seabed, moving the vessel forwardly whilst guiding the pipeline around said curved path so that the pipe string passes around the path and is then released in a downwards direction towards the seabed until the trailing end of the pipeline is above sea level, stopping the vessel and release of the pipeline, aligning an upper end of a further pipe string at the entry to the curved path, connecting the upper end of the further pipe string to the trailing end of the pipeline and then resuming forward movement of the vessel and release of the pipeline from the vessel to lay the pipeline on the seabed.

In one method according to the invention release of pipeline is stopped when the trailing end of the pipeline reaches the entry to the curved path, an upper end of a further pipestring is then attached to the trailing end of the pipeline and the movement of the vessel and release of the pipeline is continued.

In an alternative method according to the invention release of pipeline is stopped when the trailing end of the pipeline reaches the exit from the curved path, the leading end of a further pipe string is located at the entry to the curved path, the leading end of the further pipestring is fed around the curved path and attached to the trailing end of the pipeline at the exit to the curved path and the movement of the vessel and release of the pipeline from the vessel are resumed.

In any of the above methods a leading end of a pipe string may be attached to a trailing end of the pipeline by welding or by a mechanical attachment.

Also in any of the above methods release of the pipeline from the vessel may be controlled at the exit from the curved path.

Preferably a plurality of vertically extending pipe strings may be assembled and suspended from the vessel for attachment to the pipeline.

In one particular method according to the invention an initial pipe string to be laid on the seabed is suspended at the exit end of the curved path, the lower end of the pipe string is anchored to the seabed and a further pipe string is aligned at the entry to the curved path and connected to the trailing end of the first pipe showing moving the vessel whilst guiding the pipeline around said curved path to lay the pipeline on the seabed until the trailing end of the pipeline is above sea level for attachment of a further pipe string thereto.

The invention also provides a pipe laying vessel for laying a pipeline on the seabed having means for suspending a pipe string vertically from the vessel extending from its upper end vertically downwardly towards the seabed, means to guide the pipeline through a vertically extending semi-circular arch having an entry at one end of the arch and an exit at the other end of the arch means to support an upper end of a pipe string at the entry to the arch for connection to a trailing end of the pipeline and means to hold the pipeline against release from the vessel during attachment of an upper end of a pipe string to a trailing end of the pipeline and to allow controlled release of the pipeline over the arch and downwardly from the vessel towards the seabed as the vessel moves forwardly over the seabed.

In one arrangement according to the invention means may be provided for suspending a pipe string from a vessel at a location spaced from the arch and for delivering a pipe string to the entry end of the arch when the trailing end of the pipeline is ready for attachment of a further pipe string.

More specifically means may be provided for suspending a plurality of further pipe strings to be connected to the pipeline on the vessel.

For example means may be provided for attaching lengths of pipeline together to make up pipe strings and suspending the pipe strings from the vessel ready for attachment to the pipeline.

According to a further feature of the invention a conveyor system may extend around the semi-circular arch for engaging and controlling movement of the pipeline around the arch.

The invention also provides a method of making an underwater multi-member elongate structure from a surface vessel comprising the steps of assembling lengths of elongate members to form intermediate assemblies suspended from the vessel at their upper ends, guiding an intermediate assembly over a generally semi-circular curved path having an upwardly directed entry and a downwardly directed exit, and guiding a leading end of the intermediate assembly to extend towards the seabed until the trailing end of the assembly is above sea level, stopping release of the intermediate assembly, locating a further intermediate assembly with its upper end at the entry to the curved path, connecting the upper end of the further assembly to the trailing end of the previous assembly and then resuming release of the assembly from the vessel and adding further intermediate assemblies until a structure of the requisite length has been created.

Such structures would be particularly suitable for use as tendons for anchoring so-called tension leg platforms which are typically used in very deep water.

In one specific method according to the invention, release of intermediate assembly is stopped when the trailing end of the assembly reaches the entry to the curved path, an upper end of a further intermediate assembly is then attached to the trailing end of the assembly and the release of the assembly is then continued.

In an alternative method, release of intermediate assembly is stopped when the trailing end of the assembly reaches the exit from the curved path, the leading end of a further intermediate assembly is located at the entry to the curved path, the leading end of the further assembly is fed around the curved path and attached to the trailing end of the previous assembly at the exit to the curved path and release of the assembly from the vessel is then resumed.

The invention also provides a method of laying rigid conduits.

BRIEF DESCRIPTION OF THE DRAWINGS

FIGS. 7 to 15 illustrate the step by step operation of laying pipelines from the vessel on the seabed.

DESCRIPTION OF THE PREFERRED EMBODIMENTS

Figure 1:
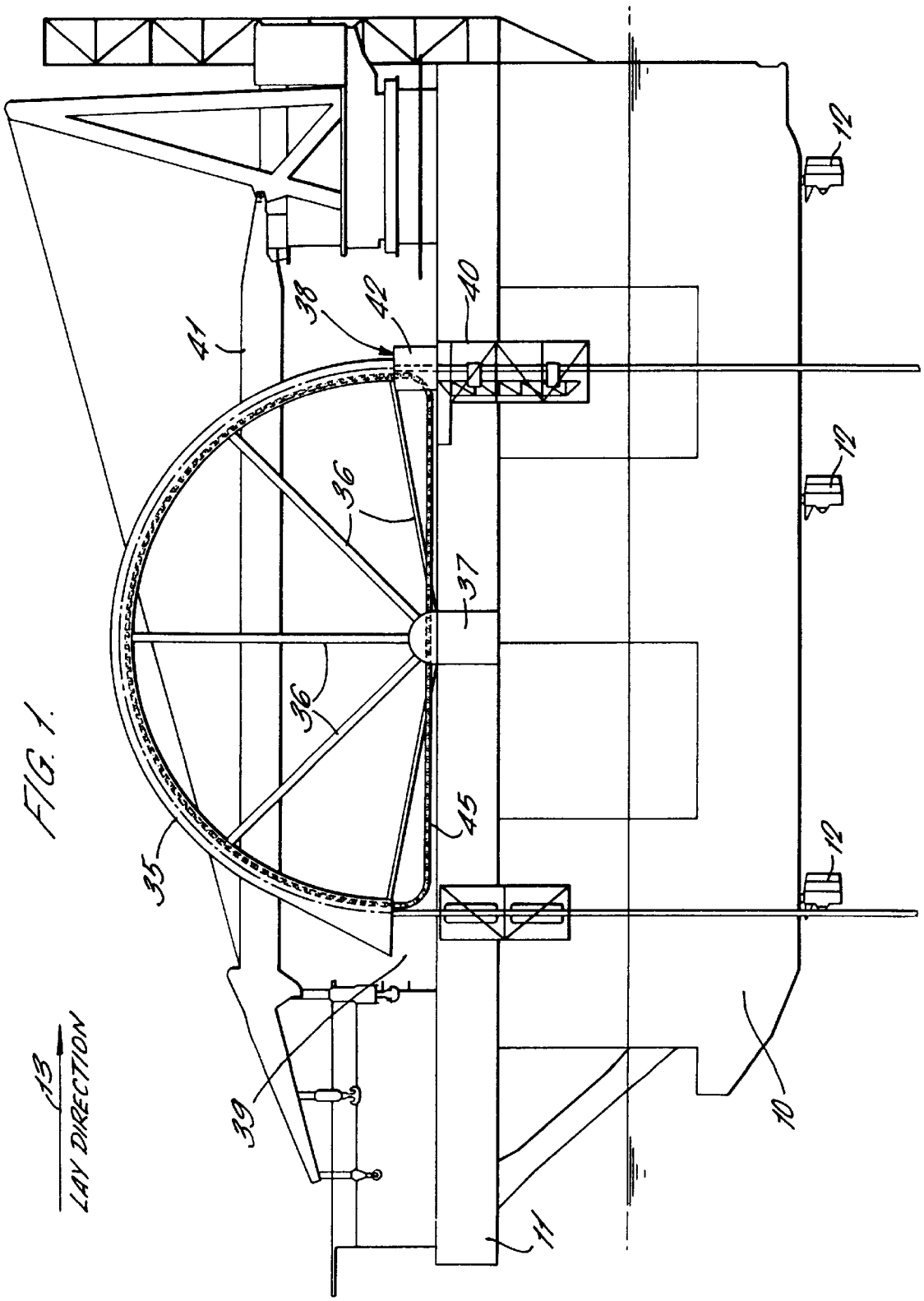
FIG. 1 is a side elevation view of a subsea pipe laying vessel embodying an arch form pipeline on the side of the vessel.
Figure 2:
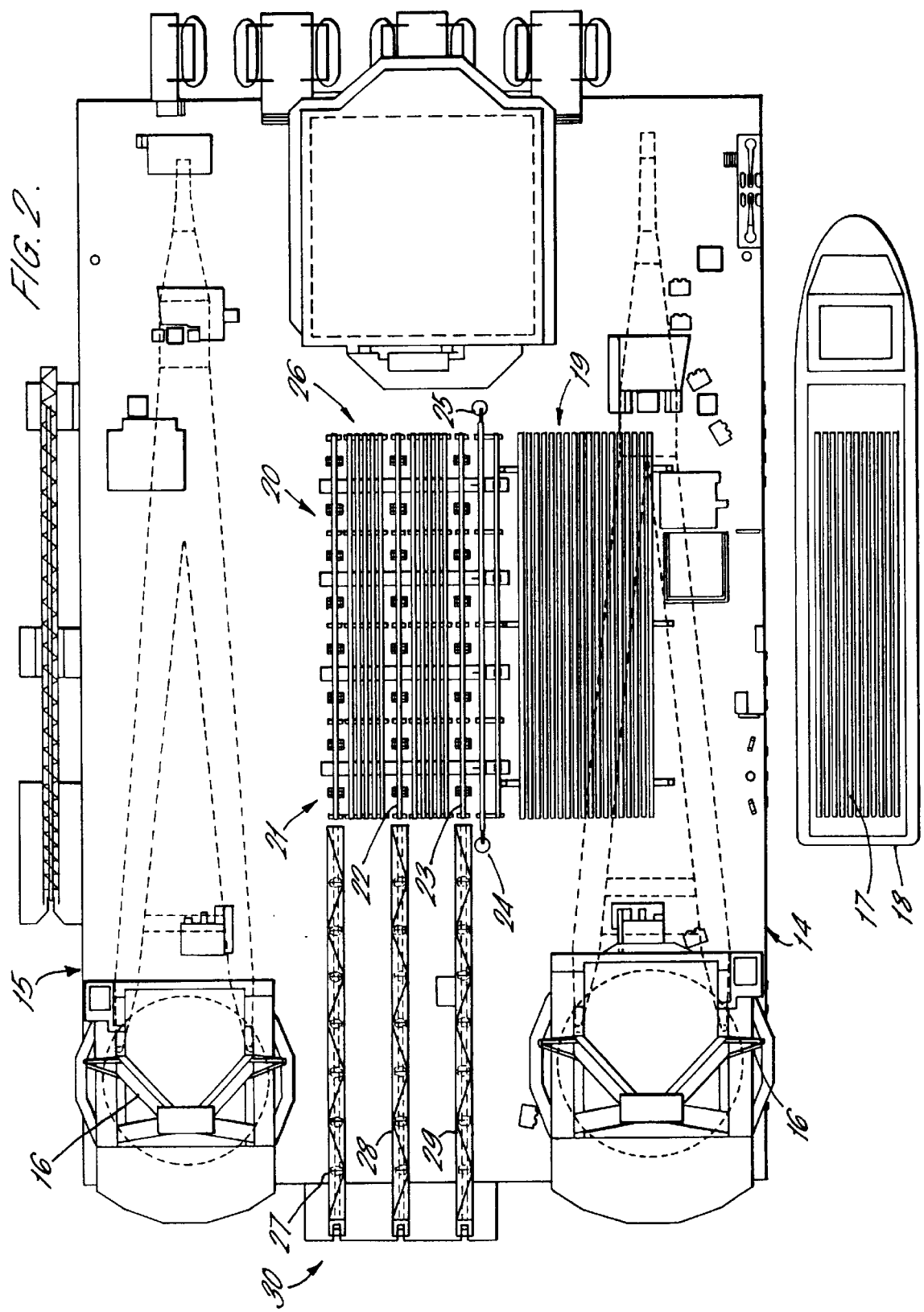
FIG. 2 is a plan view of the vessel showing the deck arrangement.

The pipelaying vessel comprises a hull 10 having a deck 11 which is generally rectangular as can be seen in the plan view of FIG. 2. The hull is propelled by a number of thrusters 12 mounted at spaced locations on the under side of the hull which can be rotated about vertical axes to drive the hull forwards, backwards, sideways and to spin about its axis. The lay direction of the vessel is indicated by the arrow 13 at the top of the figure.

The vessel has a loading side 14 and a laying side 15 as seen in FIG. 2. A crane indicated at 16 is mounted on the hull adjacent the loading side for lifting lengths of pipeline indicated at 17 from a supply vessel 18 and laying them in a storage area indicated at 19 on the deck.

The lengths of pipeline are steel tubes normally encased in epoxy or other plastics coating to provide protection on the seabed. A work area indicated generally at 20 is provided on the deck immediately adjacent storage area 19 at which there are three work stations indicated at 21, 22 and 23. Before a length of pipeline is supplied to a work station, the ends of the pipeline are cleaned and bevelled at stations 24 and 25 to prepare the ends for welding to ends of further pipes. A supply of pipes for each work station is indicated at 26. Pipes are fed from the three work stations by three parallel conveyors 27, 28 and 29, and are raised vertical by lifting mechanisms indicated generally at 30 and transferred to holding mechanisms for holding the pipes suspended vertically from their upper ends into the sea. Once one length of pipe has been transferred to a holding mechanism, a further length can be lifted vertical by the lifting mechanism and the lower end of the new pipe aligned with the upper end of the pipe supported in the holding means. Welding apparatus is provided for each work station for welding the pipe ends together and coating apparatus is provided for applying epoxy or another plastics coating over the welded joint. The pipe string is then lowered to receive the next length of pipe and so on until a pipe string has been assembled which extends a substantial part of the distance of the sea bed.

On the pipe laying side 15 of the vessel, there is a pipelaying guide comprising a large arch shaped structure 35 of hollow box form cross-section supported by spokes 36 radiating from a hub 37 mounted on the side of the vessel. The arch has an entry indicated at 38 to receive an upper end of a pipestring to be fed over the arch and an exit 39 from where the pipestring passes to the seabed. The span of the arch corresponds to a substantial part of the length of the vessel so that the radius of curvature of the arch is relatively large allowing a pipestring to follow the radius without undue stressing.

A pipe string manipulator 40 is mounted on the side of the vessel immediately below the entry end to the arch to hold an upper end of a pipe string for connection to the trailing end of a previous length of pipeline, as will be described below. A second crane mechanism 41 is mounted on the deck of the vessel adjacent said lay side for transferring assembled lengths of pipe strings from the holding mechanisms at the stern of the vessel to the manipulator 40. Alternatively, a carriage mechanism may be provided on the stern/side of the vessel for transferring pipe strings from the stern to the holding manipulator 40.

A standard workstation indicated generally at 42 is provided at the entry 38 to the arch for aligning the leading end of a further pipe string with the trailing end of the previously connected pipe string for welding the ends together and coating over the welded joint.

The end of the pipeline may be held by an external line up tool (of the type well known in the offshore industry) to align the pipe end with the end of the new pipe string for connection together. Alternatively the end of the pipeline may be held in position and the line up with the new pipe string may be performed by the manipulator or a line up tool integrated in the manipulator. After line up, the pipe ends are connected, e.g. by welding and the welding area is coated after which pipelaying can proceed by controlled release of the pipeline and simultaneous advance of the vessel.

At the exit 39 from the, standard pipeline tensioners 43 are mounted on the side of the vessel/deck to control release of the pipeline to the seabed and to stop release of the pipeline from the vessel when required.

In this embodiment the pipestring is guided over the arch in a simple way e.g. over regularly spaced rollers mounted at spaced locations around the outer side of the arch. The rollers may be free running because the tensioners control the pay out. Where the pipeline diameter is sufficiently small compared with the arch radius the pipeline follows the curve of the arch by virtue of the weight of the pipeline alone. If required, however, the pipeline can be forced against the arch by further rollers regularly spaced along the outer periphery of the arch as indicated above.

Alternatively a free running endless chain mechanism 45 may extend over the arch guided on spaced rollers to facilitate running of the pipe string over the arch. The conveyor mechanism is provided with driving means which can also serve as tensioners to hold and pay-out or recover the pipeline to supplement or in place of the tensioners at the exit end of the arch.

Figure 3:
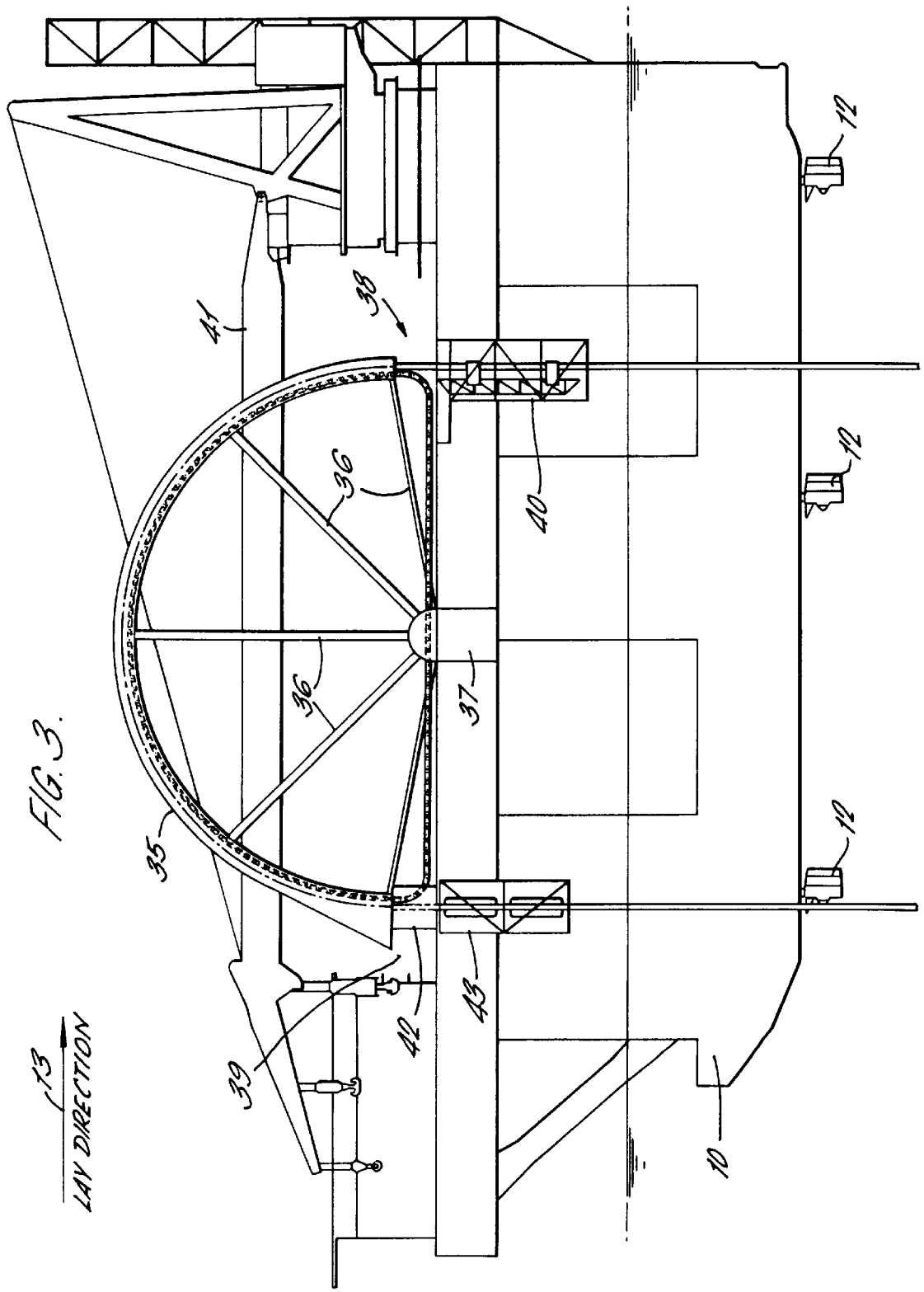
FIG. 3 is a similar view to FIG. 1 showing a further arrangement.

In the arrangement of FIG. 3, the workstation 42 for connecting pipeline and pipe string is located near the tensioners 43 which means that support for a new pipestring has to be taken over from the manipulator and the pipestring has to be guided over the arch.

Figure 4:
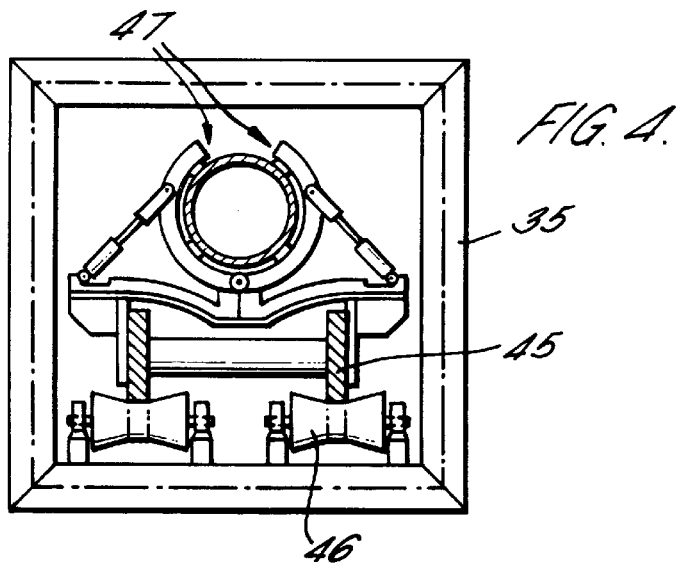
FIG. 4 is a detailed view of part of the arch form guide.
Figure 5:
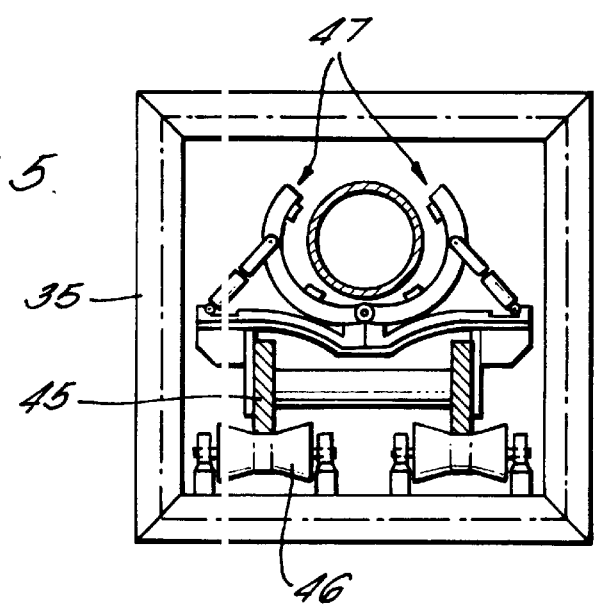
FIGS. 5 and 6 show an alternative arrangement for the arch form guide of FIG. 4.

Referring to FIGS. 4 and 5, an endless chain mechanism 45 extends around the inner side of the arch 35 and between the entry and exit of the arch guided by spaced pairs of rollers 46. The chain mechanism has a power drive (not shown). The endless chain mechanism carries spaced releasable ram operated pipe grippers 47 to receive and hold a pipe to guide the pipe around the arch. In addition, guide rollers (not shown) may be mounted around the inner side of the outer wall of the arch to act on the outer side of a pipeline to assist in guiding the pipeline around the arch.

Figure 6:
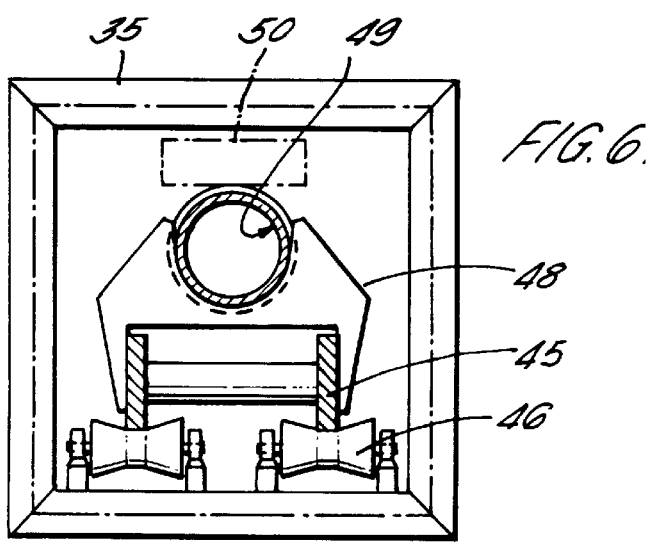
Figure 9:
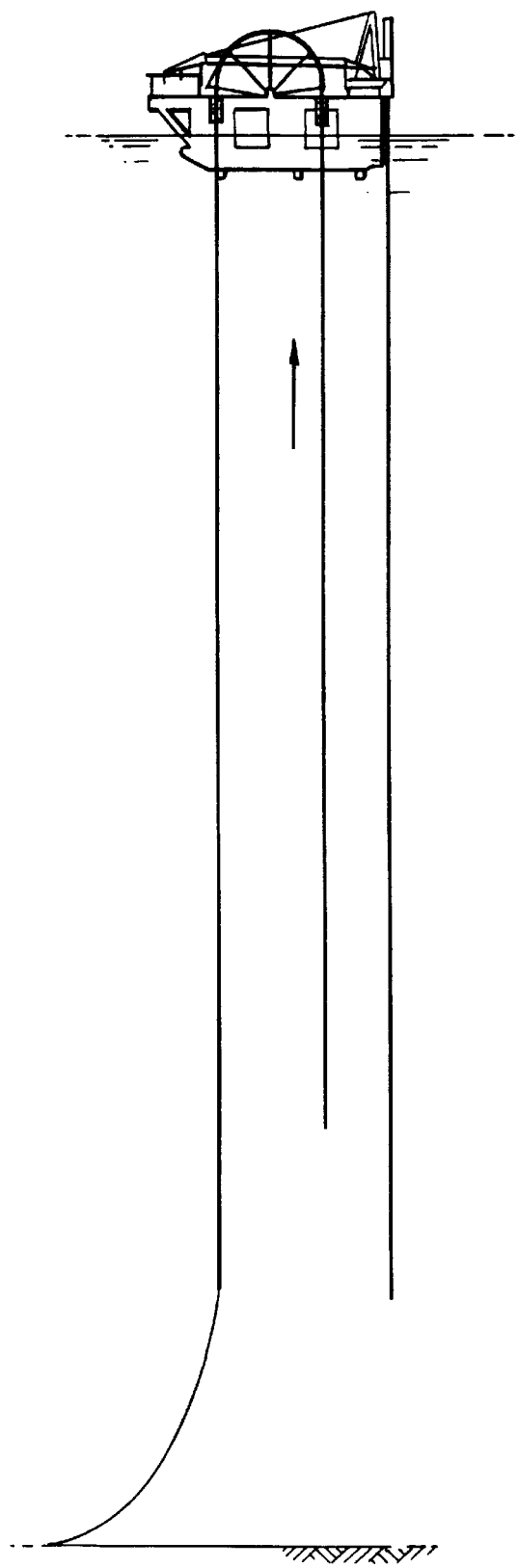
Figure 10:
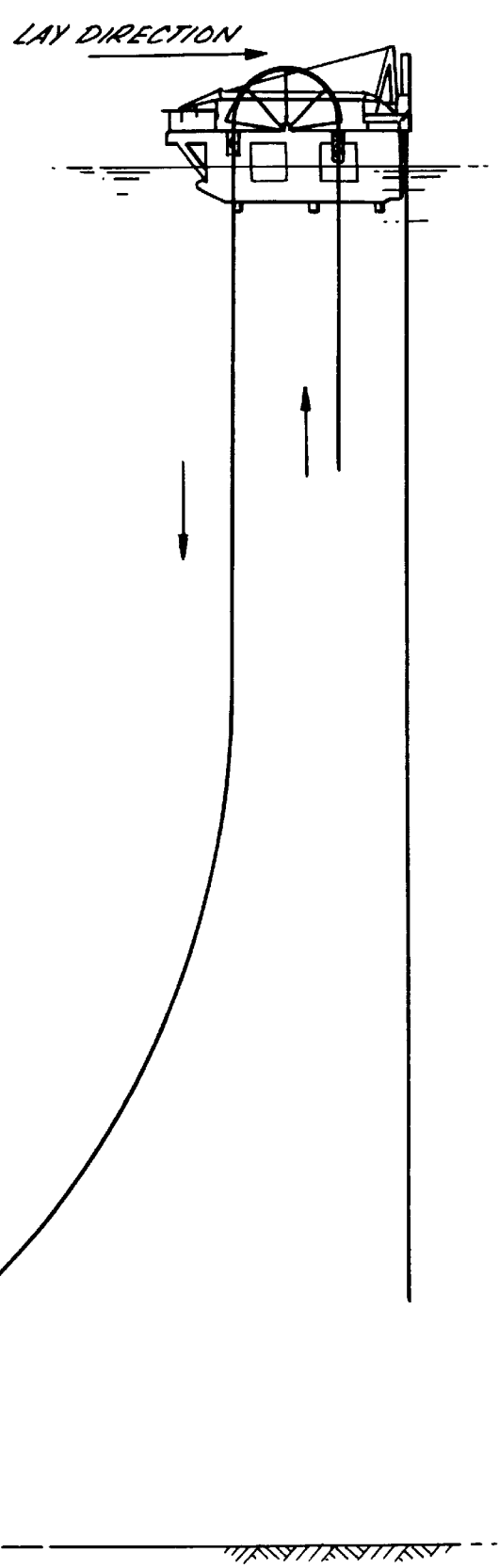
Figure 11:
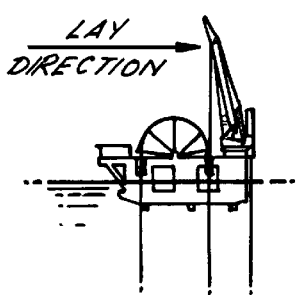
Figure 12:
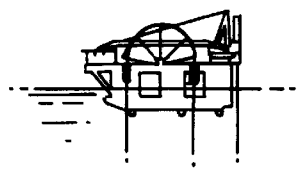
Figure 13:
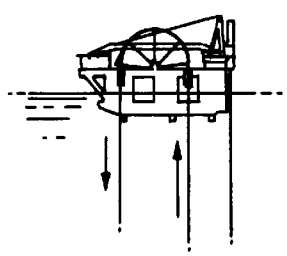
Figure 14:
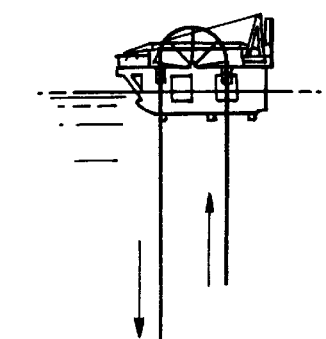
Figure 15:
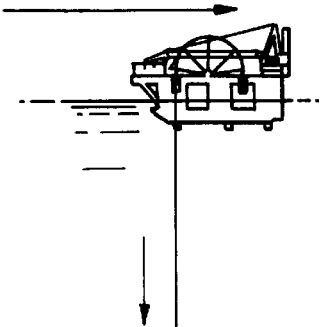

FIG. 6 shows a further arrangement in which open topped grippers 48 are located at spaced locations around the chain conveyor system to engage shoulders 49 on the pipe string to draw the pipe string around the arch. If the pipe string has to be forced against the arch to follow its curvature the conveyer chain must be guided over the arch in such a way that uplift of the conveyer chain from the arch is prevented or, guide rollers 50 are provided around the outer periphery of the arch to guide the pipe string around the arch.

Referring now to FIGS. 7 to 13, there is shown diagrammatically the step by step operation of commencing laying a pipeline on the seabed using the vessel as described above. FIG. 7 shows the vessel stern on with a number of vertically extending pipe strings in the course of assembly. As can be seen, the completed pipe string extends substantial part of the distance to the seabed.

FIG. 8 shows the vessel side on and a first pipe string has been lifted by the crane 41 into position at the exit end of the arch with the upper end of the pipe string supported from the tensioning mechanisms 43 and the lower end of the pipe string connected by an anchor cable 51 to a seabed anchor 52. A further pipe string to be connected to the first string is located with its upper end at the entry end 39 to the arcuate guide track and is supported in the manipulator 40. The conveyor mechanism 38 is used to feed the upper end of the pipe string around the arcuate guide track until it reaches the upper end of the first pipe string supported on the tensioners 43. The ends of the still pipe are welded together and the joint is coated to seal the joint. Once the joint is complete, the tensioners are operated to release the pipe string and the vessel is advanced using the thrusters 12 as can be seen, a further pipe string is already in position at the bow of the vessel for use when required. As the vessel moves forward, the further pipe string feeds over the arcuate guide track and downwardly from the vessel to form the pipeline to be laid on the seabed. When the trailing end of the pipe string reaches the entry end 39 of the arcuate guide track vessel movement is terminated and the tensioners operated to lock the pipeline against release from the vessel. The next pipe string is then transferred using crane 41 to the manipulator 40 and its upper end is joined to the trailing end of the previous pipe string in the entry end to the guide track. The steel ends of the pipe strings are welded together and the resulting joint is encased in concrete. Once the joint is made, pipelaying can resume, the vessel moving forwardly and the pipeline being released under the control of the tensioners 43. The operation continues until the required length of the pipeline has been laid.

Figure 16:
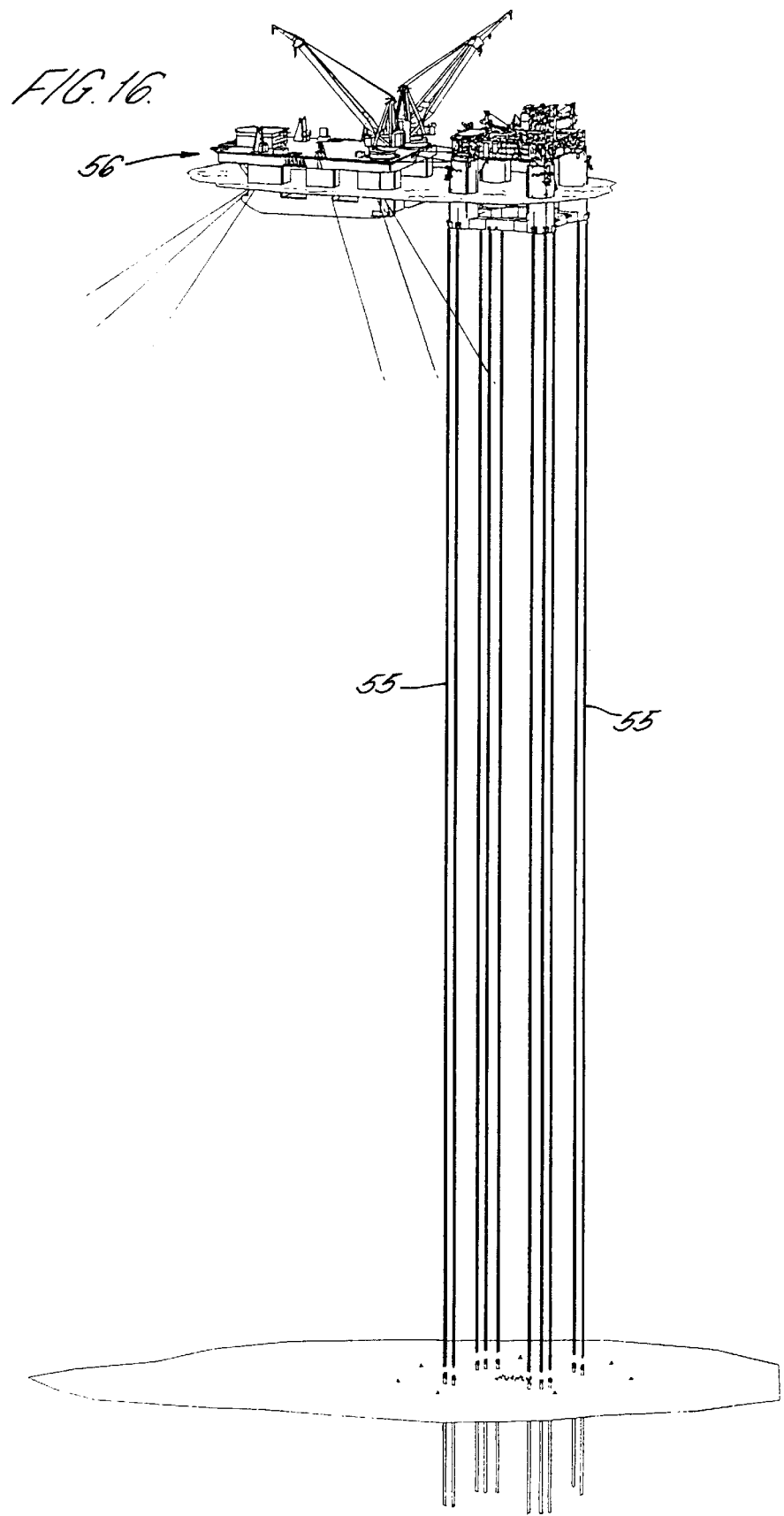
FIG. 16 is a diagrammatic view of an offshore platform anchored by tendons.

It will be appreciated that many modifications may be made to the embodiment of the invention described above without departing from the scope of the invention. Equally, the method and apparatus may be applied to assembling and installing other elongate elements underwater. For example, the elongate elements could be sections to form tendons for anchoring tension leg platforms. FIG. 16 illustrates an arrangement of such tendons 55 extending vertically between a floating hydrocarbon production installation 56 and a fixed point on the seabed (not shown) to anchor the installation in place.

We claim:

1. A method of making an underwater multi-member elongate structure from a surface vessel comprising the steps of assembling lengths of elongate members to form intermediate assemblies suspended from the vessel at their upper ends, guiding an intermediate assembly over a generally semi-circular curved path having an upwardly directed entry and a downwardly directed exit, and guiding a leading end of the intermediate assembly to extend towards the seabed until the trailing end of the assembly is above sea level, stopping release of the intermediate assembly, locating a further intermediate assembly with its upper end at the entry to the curved path, connecting the upper end of the further assembly to the trailing end of the previous assembly and then resuming release of the assembly from the vessel and adding further intermediate assemblies until a structure of the requisite length has been created.

2. A method as claimed in claim 1, wherein release of intermediate assembly is stopped when the trailing end of the assembly reaches the entry to the curved path, an upper end of a further intermediate assembly is then attached to the trailing end of the assembly and the release of the assembly is then continued.

3. A method as claimed in claim 1, wherein release of intermediate assembly is stopped when the trailing end of the assembly reaches the exit from the curved path, the leading end of a further intermediate assembly is located at the entry to the curved path, the leading end of the further assembly is fed around the curved path and attached to the trailing end of the previous assembly at the exit to the curved path and release of the assembly from the vessel is then resumed.

4. A method as claimed in claim 1, wherein the elongate structure is a tendon for providing a tension leg between a floating platform and a seabed anchorage.

5. A method of laying a seabed pipeline from a surface vessel comprising the steps of assembling pipe strings suspended at their upper ends vertically from the vessel for attachment in a pipeline extending from the vessel to the seabed, attaching an upper end of a pipe string to a trailing end of a pipeline, guiding the pipeline through a generally semi-circular curved path having an upwardly directed entry and a downwardly directed exit from where the pipeline extends to the seabed, moving the vessel forwardly whilst guiding the pipeline around said curved path so that the pipe string passes around the path and is then released in a downwards direction towards the seabed until the trailing end of the pipeline is above sea level, stopping the vessel and release of the pipeline, locating a further pipe string with its upper end at the entry to the curved path, connecting the upper end of the further pipe string to the trailing end of the pipeline and then resuming forward movement of the vessel and release of the pipeline from the vessel to lay the pipeline on the seabed.

6. A method as claimed in claim 5, wherein release of pipeline is stopped when the trailing end of the pipeline reaches the entry to the curved path, an upper end of a further pipestring is then attached to the trailing end of the pipeline and the movement of the vessel and release of the pipeline is then continued.

7. A method as claimed in claim 5, wherein release of pipeline is stopped when the trailing end of the pipestring reaches the exit from the curved path, the leading end of a further pipe string is located at the entry to the curved path, the leading end of the further pipe string is fed around the curved path and attached to the trailing end of the pipeline at the exit to the curved path and the movement of the vessel and release of the pipeline from the vessel is then resumed.

8. A method as claimed in claim 5, wherein a leading end of a pipe string is attached to a trailing end of the pipeline by welding or by a mechanical attachment.

9. A method as claimed in claim 5, wherein release of the pipeline from the vessel is controlled at the exit from the curved path.

10. A method as claimed in claim 5, wherein a continuous conveyor system extends around the arch for controlling movement of a pipestring over the arch.

11. A method as claimed in claim 10, wherein the conveyor system is used to control the release of the pipeline from the vessel.

12. A method as claimed in claim 5, wherein a plurality of vertically extending pipe strings are assembled and suspended from the vessel for attachment to the pipeline at either the entry or exit of the curved path.

13. A method as claimed in claim 5, wherein an initial pipe string to be laid on the seabed is suspended at the exit end of the curved path, the lower end of the pipe string is anchored to the seabed and a further pipe string is aligned at the entry to the curved path and connected to the trailing end of the first pipestring moving the vessel forward whilst guiding the pipeline around said curved path to lay the pipeline on the seabed until the trailing end of the pipeline is above sea level for attachment of a further pipe string thereto.

14. A pipe laying vessel for laying a pipeline on the seabed having means for suspending a pipe string vertically from the vessel extending from its upper end vertically downwardly towards the seabed, means to guide the pipeline through a vertically extending semi-circular arch having an entry at one end of the arch an and exit at the other end of the arch, means to support an upper end of a pipe string at the entry to the arch for connection to a trailing end of the pipeline and means to hold the pipeline against release from the vessel during attachment of an upper end of a pipe string to a trailing end of the pipeline and to allow controlled release of the pipeline over the arch and downwardly from the vessel towards the seabed as the vessel moves forwardly over the seabed.

15. A vessel as claimed in claim 14, wherein a conveyor system extends around the semi-circular arch for engaging and controlling movement of the pipeline around the arch.

16. A vessel as claimed in claim 14, wherein means are provided for suspending a pipe string from a vessel at a location spaced from the arch and for delivering a pipe string to the entry end of the arch when the trailing end of the pipeline is ready for attachment of a further pipe string.

17. A vessel as claimed in claim 14, wherein means are provided for suspending a plurality of further pipe strings to be connected to the pipeline on the vessel.

18. A vessel as claimed in claim 17, wherein means are provided for attaching lengths of pipeline together to make up pipe strings and suspending the pipe strings from the vessel ready for attachment to the pipeline.

* * * * *